(No Model.) 2 Sheets—Sheet 1.
R. W. HEPPELL.
APPARATUS FOR PAINTING ELECTRIC WIRES AND THEIR COVERINGS.
No. 443,237. Patented Dec. 23, 1890.
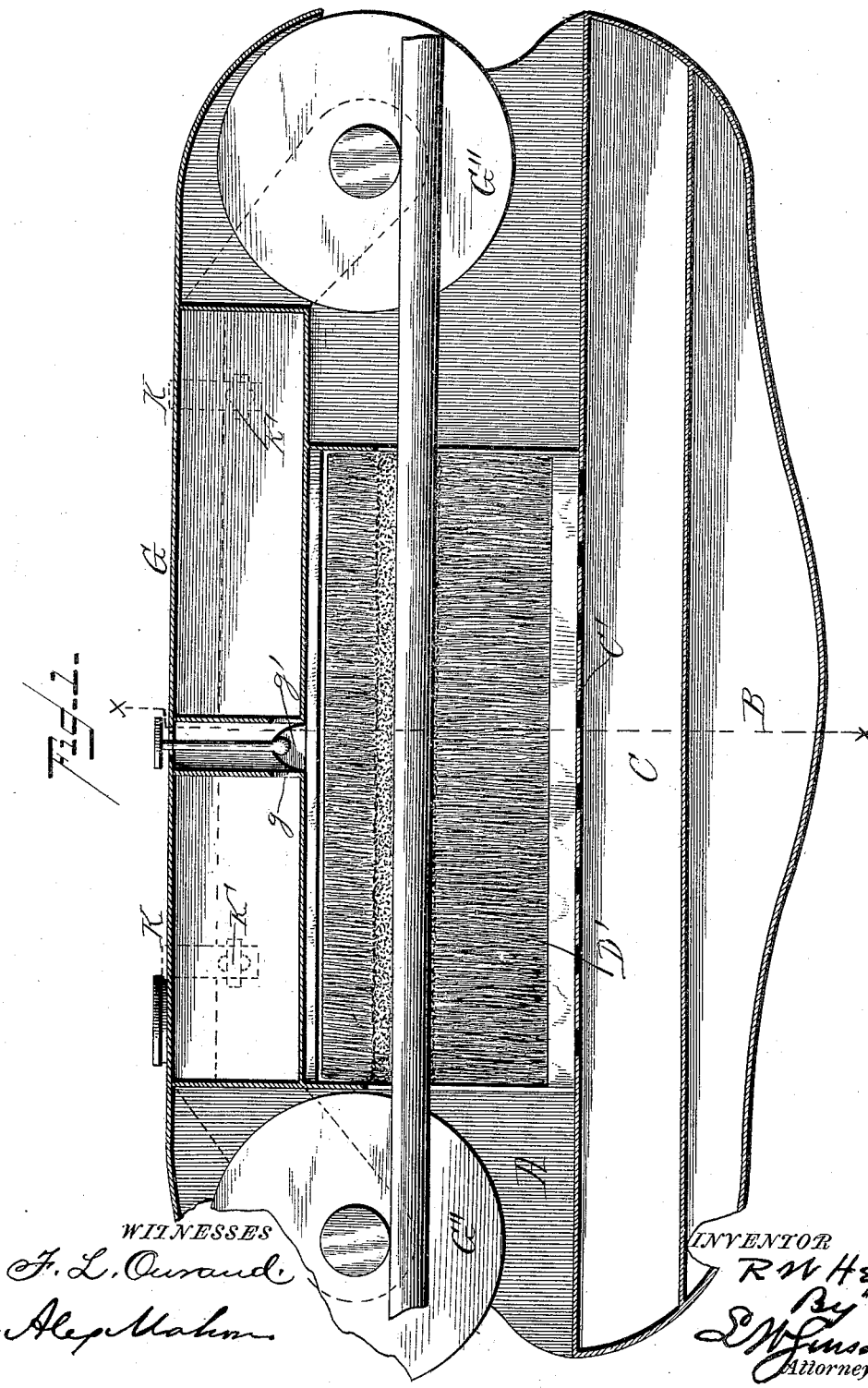
WITNESSES
F. L. Durand
Alex Mahn
INVENTOR
R W Heppell
By
L W Finsabaugh
Attorney

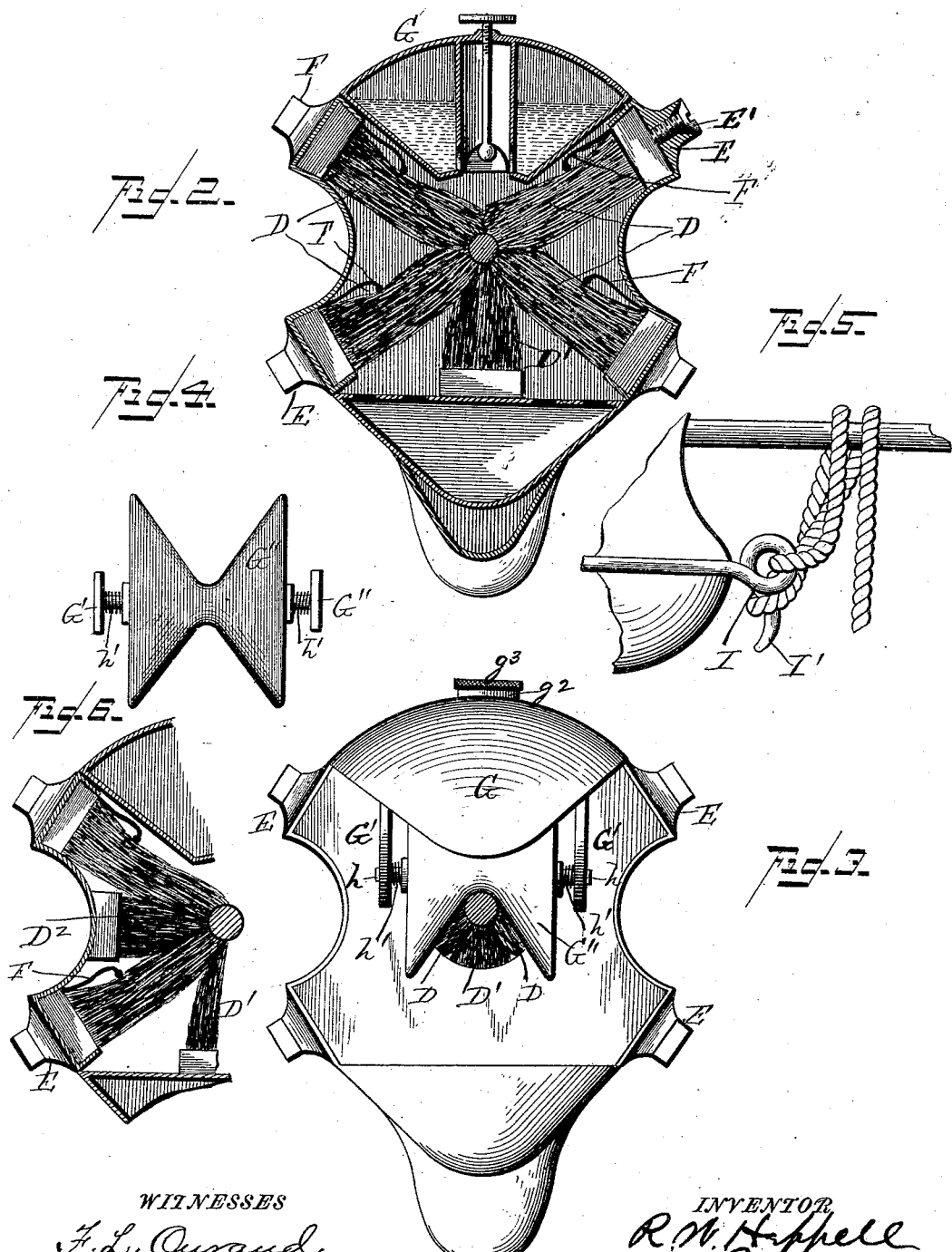

UNITED STATES PATENT OFFICE.

RICHARD W. HEPPELL, OF DUNKIRK, NEW YORK.

APPARATUS FOR PAINTING ELECTRIC WIRES AND THEIR COVERINGS.

SPECIFICATION forming part of Letters Patent No. 443,237, dated December 23, 1890.

Application filed January 23, 1890. Serial No. 337,780. (No model.)

*To all whom it may concern:*

Be it known that I, RICHARD W. HEPPELL, a citizen of the United States, residing at Dunkirk, in the county of Chautauqua and State of New York, have invented new and useful Improvements in Apparatus for Coating Electric Wires and their Coverings; and I do hereby declare the following to be a full, clear, and exact description of said invention, reference being had to the accompanying drawings, and to the letters of reference marked thereon, which form a part of this specification.

My invention relates to a novel device for coating the insulation of electric wires.

My invention consists, first, in the combination, with fixed brushes arranged within a case, of a feeder for feeding the coating material to the brushes as the apparatus is drawn along the wires.

It further consists in making the brushes adjustable for providing for the wear of the same.

It further consists in so constructing the brush-heads and their holders that the brushes may be turned or reversed as the same become worn on one side.

It further consists in certain novel features in the construction and arrangement of parts, all as hereinafter described.

In the accompanying drawings, Figure 1 is a longitudinal section through the apparatus. Fig. 2 is a transverse vertical section on the line $x\,x$, Fig. 1. Fig. 3 is an end view. Fig. 4 is a front view of one of the guiding and supporting wheels. Fig. 5 is a section of one end of the case, showing one of the eyes to which the cord is attached for drawing the apparatus along the wire, the hook by which the apparatus is supported, and the manner of supporting and holding the apparatus on the wire while the receiver is being filled, or for other purposes. Fig. 6 is a transverse vertical section of a modification of the device, wherein additional brushes are used for particularly adapting the apparatus for heavy cables.

The case in which the devices are mounted consists of a box A, made, preferably, of a suitable non-conducting material having its ends curved and formed in such manner as to best adapt the apparatus to pass obstructions in its path in being drawn through trees or past similar obstructions. The lower portion of the case is provided with a compartment B for receiving or holding a suitable substance to weight the apparatus and hold and balance it on the wire in being drawn along the same. Above the compartment B is a second compartment C, having an opening extending throughout its length, covered by a strainer C', for catching and holding the overflow of material dropping from the brushes from falling on persons or things under the apparatus, and also for saving such material.

In suitable bearings formed in the case are arranged brushes D, extending longitudinally of the apparatus, with the bristles thereof extending from the heads radially toward a common center, so that the ends of the several brushes shall meet at a central point, at which the wire shall be caused to pass as the apparatus is drawn along the wire, the bristles of the brushes being of such length as to allow for the passage of connections, defective insulations, or provide for irregularities in the wire caused by twists or bends while providing for the proper coating of the same. A brush D' is arranged directly under the series of brushes D and extending longitudinally of the apparatus, and which brush is supported on the strainer C'. The bristles of this brush are preferably cut in wedge shape to cause the same to act properly in connection with the others to insure the proper coating of the wire or cable.

In Fig. 6 I have shown two additional brushes $D^2$, extending from the sides of the case longitudinally of the apparatus and meeting at the center with the other brushes. These brushes $D^2$ also have their bristles cut in wedge shape, and the purpose of which brushes is to particularly adapt the apparatus for heavy cables, and may be removed when the apparatus is used for coating small cables or wires.

The bearings for the brushes and the brush-heads are made in wedge form to provide for properly holding the brushes, and also provide for the reversal or interchange of the brushes as the brushes become worn on one side by the action of the wire thereon, and the side walls of the bearings are made flexible or yielding, as hereinafter referred to.

Near each end of the bearings for the brushes are arranged screw-threaded caps E for receiving adjusting-screws E', adapted to engage the backs of the brushes for moving them inward as they become worn at the ends, the flexible side walls of the bearings permitting such adjustment, while acting to hold the brushes firmly in proper position.

A spring plate or bar F is connected to the case to engage the side face of the bristles to hold the bristles in proper position against the wire or cable to insure the proper coating of the same and at the same time with a yielding force.

G is a feeder for receiving the material with which the insulated wire or cable is to be coated or recoated, which mixture may consist of any suitable ingredients mixed in any suitable way. A mixture which is preferably used and which has been found best adapted to prevent the insulation from absorbing water and otherwise preserving and improving the insulation consists of boiled linseed-oil, beeswax, copal, and iron oxide; but, as above stated, any other compound may be used which shall be found most desirable.

The feeder extends from end to end of the apparatus, and is provided with any desired number of outlet-openings $g$, controlled by valves $g'$. A vent $g^2$, covered by a removable cap or cover $g^3$, communicates with the feeder, by which air is admitted to the feeder to insure the proper flow of the mixture.

At each end of the feeder G are arranged bearings G', extending out from the same, in which are mounted guiding and supporting wheels G'', the bearings being so arranged as to bring the wheels in line with the end of the brushes to properly guide the wire or cable thereto. These guiding and supporting wheels or rollers are mounted on a shaft $h$, and also mounted on said shaft and between the side face thereof and the inner side faces of the bearings are coiled springs $h'$, which act to permit the wheels to yield from side to side as the wire passes through by the machine being drawn along on the same to provide for kinks or bends in the wire, and the operating-faces of the wheels are so curved as to give the wire a greater range of movement from side to side to still further provide for a free passage of the wire having such kinks or bends without interfering with the proper action of the apparatus, or so that while one portion of the wire at one end may have a kink or bend and be straight at the other, the wheels will accommodate themselves thereto each independent of the other.

At each end of the apparatus is secured an eye I and hook I', the eye being to connect the cord by which the apparatus is drawn along or back and forth over the wire, and the hook being for the purpose of receiving a loop of the cord after being passed around the wire for holding the apparatus, while the feeder is being filled or while the apparatus is at rest for any purpose. The feeder fits within a recess in the case, and is provided with straps K on each side and at each end, and the case is provided with a hook or button K', with which the strap may be engaged for holding the feeder and case together and at the same time hold the apparatus engaged with the wire while being drawn along the same.

The operation is as follows: When a wire is found to need coating or recoating, the apparatus is placed thereon so that the same shall be engaged by the brushes. The feeder is then supplied and secured in place, and the vent and valves are then opened. The operator or operators then, by means of the cords from pole to pole, insulator to insulator, or from the street, draw the apparatus back and forth between them until a sufficient quantity of the coating-mixture has been applied; or the apparatus may be operated by a single attendant by the arrangement of suitable pulleys. Should the material run out, or should the operator desire for any reason to suspend operations, he loops the cord around the wire and engages the loop with the hook, after which he can remove the feeder to refill it, or leave the apparatus locked to the wire to prevent it from being tampered with by unauthorized persons.

Having now described my invention, what I claim, and desire to secure by Letters Patent, is—

1. In a device for coating electric wires or cables, a case, in combination with brush-holders made in substantially wedge form, and brushes having their backs formed to fit the holders and detachably connected therewith, substantially as described, whereby the brushes may be reversed or interchanged, as set forth.

2. In a device for coating electric wires or cables, the combination of the case, the feeder for feeding the material to the brushes, and a receptacle covered by a strainer through which the superfluous material is caused to pass, substantially as described.

3. In a device for coating electric wires or cables, a case, in combination with the brush-holders made in wedge form, with the side walls made flexible or yielding, and brushes having their backs formed to fit the holders, substantially as and for the purpose set forth.

4. In a device for coating electric wires or cables, a case, in combination with the brush-holders provided with the adjusting devices for engaging the brush-back for adjusting the bristles to provide for wear or size of wire or cable, substantially as described.

5. In a device for coating electric wires or cables, a case, in combination with guide wheels or rollers mounted in yielding bearings for adapting them to move sidewise, substantially as described.

6. In a device for coating electric wires or cables, a case, in combination with brushes arranged parallel to the wire to be coated, and the guide wheels or rollers arranged at each end of the brushes, mounted in yielding bearings, substantially as described, whereby the wheels may move sidewise relative to the brushes and independently of each other, as set forth.

7. In a device for coating electric wires or cables, the combination of a case for containing the brushes with a removable feeder independent of the brushes for holding the material, substantially as described.

8. In a device for coating electric wires or cables, a case in which the devices for coating the wires are mounted, an eye to which to attach a cord to propel the device, and a hook to be engaged by the cord to hold the device on the wire while at rest, substantially as described.

In testimony whereof I affix my signature in the presence of two subscribing witnesses.

R. W. HEPPELL.

Witnesses:
ALEX. MAHON,
H. M. STERLING.